United States Patent
Kotliar (10) Patent No.: US 6,560,991 B1
(45) Date of Patent: May 13, 2003

(54) HYPERBARIC HYPOXIC FIRE ESCAPE AND SUPPRESSION SYSTEMS FOR MULTILEVEL BUILDINGS, TRANSPORTATION TUNNELS AND OTHER HUMAN-OCCUPIED ENVIRONMENTS

(76) Inventor: Igor K. Kotliar, 50 Lexington Ave. #249, New York, NY (US) 10010

(*) Notice: Subject to any disclaimer, the term of this patent is extended or adjusted under 35 U.S.C. 154(b) by 0 days.

(21) Appl. No.: 10/024,079

(22) Filed: Dec. 17, 2001

Related U.S. Application Data (63) Continuation-in-part of application No. 09/750,801, filed on Dec. 28, 2000, now Pat. No. 6,418,752, and a continuation-in-part of application No. 09/854,108, filed on May 11, 2001, now Pat. No. 6,401,487, and a continuation-in-part of application No. 09/975,215, filed on Oct. 10, 2001.

(51) Int. Cl.$^7$ ................................................. F17J 1/00
(52) U.S. Cl. ............................... 62/640; 62/78; 169/45; 169/61
(58) Field of Search ................... 62/640, 78; 169/45, 169/61

(56) References Cited

U.S. PATENT DOCUMENTS

| | | | |
|---|---|---|---|
| 4,896,514 A | * 1/1990 | Sugiyama et al. | 62/78 |
| 5,063,753 A | * 11/1991 | Woodruff | 62/78 |
| 5,388,413 A | * 2/1995 | Major et al. | 62/911 |
| 5,472,480 A | * 12/1995 | Barbe | 95/54 |
| 5,649,995 A | * 7/1997 | Gast, Jr. | 95/54 |
| 5,779,495 A | * 7/1998 | Dechelette et al. | 62/78 |
| 5,799,652 A | * 9/1998 | Kotliar | 128/205.11 |
| 5,921,091 A | * 7/1999 | Foss et al. | 62/46.1 |
| 6,012,533 A | * 1/2000 | Cramer | 169/45 |

* cited by examiner

Primary Examiner—Ronald Capossela
(74) Attorney, Agent, or Firm—FirePASS Corp.

(57) ABSTRACT

Hyperbaric Hypoxic Fire Escape and Suppression System is provided for multilevel buildings, transportation tunnels and other human-occupied environments. The system produces and maintains a hypoxic hyperbaric environment in a separate part of a building (staircase shaft) or a tunnel (service tunnel) in order to provide an entirely secure escape area in case of a fire emergency and instantly extinguish an ongoing fire in a building or a tunnel by releasing a breathable hyperbaric hypoxic fire-extinguishing composition into location affected by fire. Additionally, the system provides continuing adequate protection against biological and chemical warfare and contaminants by filtering ambient air before processing it by the system and by establishing breathable fire-suppressive atmosphere at a positive atmospheric pressure inside a building or tunnel.

24 Claims, 10 Drawing Sheets

HYPERBARIC HYPOXIC FIRE ESCAPE AND SUPPRESSION SYSTEMS FOR MULTILEVEL BUILDINGS, TRANSPORTATION TUNNELS AND OTHER HUMAN-OCCUPIED ENVIRONMENTS

This application is a continuation in part of: U.S. Ser. No. 09/750,801 "Hypoxic Fire Prevention and Fire Suppression Systems and Breathable Fire Extinguishing Compositions for Human Occupied Environments" filed Dec. 28, 2000, now U.S. Pat. No. 6,418,752, U.S. Ser. No. 09/854,108 "Hypoxic Fire Prevention and Fire Suppression Systems with Breathable Fire Extinguishing Compositions for Human Occupied Environments" filed May 11, 2001, now U.S. Pat. No. 6,401,487, and U.S. Ser. No. 09/975,215 "Mobile Firefighting Systems with Breathable Hypoxic Fire Extinguishing Compositions for Human Occupied Environments" filed Oct. 10, 2001.

FIELD OF THE INVENTION

The present invention introduces the method, equipment, and composition of a fire escape and suppression system that produces and maintains a hypoxic hyperbaric environment in a separate part of a building (preferably staircase shaft) or a transportation tunnel in order to provide an entirely secure escape in case of a fire emergency and instantly extinguish an ongoing fire on any floor or level of a building or any part of a tunnel.

With its mode of action based on the generation, hyperbaric storage and controlled release of <u>breathable</u> hypoxic fire-suppressive gas mixtures, this human-friendly system is completely non-toxic, fully automated and entirely self-sustaining. Consequently, it is ideally suited to provide complete fire safety in office and apartment buildings, schools, hospitals, shopping and entertainment centers, multilevel parking garages, industrial complexes, transportation tunnels, underground facilities, hermetic objects including submarines and other enclosed compartments and environments.

This invention is an important addition and improvement of the Fire Prevention and Suppression Systems (FirePASS™) described in earlier patent applications provided above.

DESCRIPTION OF PRIOR ART

Current fire suppression systems in buildings are ineffective in saving human life, especially in a catastrophic fire and destructive to property and valuables. Moreover, modern building design itself does not provide reliable escape routes and safety areas for trapped people. Staircases and elevator shafts may easy become lethal traps for fire escapees who may die from smoke inhalation or fire. Other human-occupied facilities like transportation tunnels have virtually no fire safety systems at all. The only tunnel having limited fire escape option is the tunnel between UK and France called the Eurotunnel or Chunnel. It provides a pressurized service tube between two main transport tubes that can be accessed by fire escapees if they know how and where to find pressurized entrances and are able access them. Still, the minor Chunnel fire in 1998 claimed over a billion (US) dollars from damages and business loss.

In addition, ventilation shafts and equipment (which are present in virtually all multilevel buildings and tunnels) can dramatically accelerate a fire's propagation and significantly increase the risk of toxic inhalation. Survival in a toxic environment like this is limited to only a few minutes. Statistical analysis for the last decades shows that about 70–80 percent of fire fatalities result from toxic smoke inhalation.

The present invention employs a radically different approach: the use of a hyperbaric environment of breathable hypoxic fire-preventative atmosphere as a reliable fire escape and for the suppression of fire in a communicating area. This hypoxic environment completely eliminates the ignition and combustion of all flammable materials. Moreover, it is completely safe for human breathing (clinical studies have proven that long term exposure to a hypoxic environment has significant health benefits). Hypoxic breathable air can be inexpensively produced in the necessary amount through the extraction of oxygen from ambient air.

The described here invention can be also used for protection of building occupants from inhalation hazards resulted from a biological, radionuclide and chemical warfare, by means of instant introducing and maintaining positive barometric pressure inside a building. Positive pressure systems are used in military vehicles and vessels for that purpose, however recent terrorist threats call for introduction of similar systems also in civil building construction.

The described here system allows synergistically combining the advantages of hyperbaric hypoxic environment for protection of building or tunnel occupants from respiratory hazards and preventing or minimizing structural damage from catastrophic fires.

SUMMARY OF THE INVENTION

The principal objects of this invention are as follows:

The provision of a breathable fire-extinguishing atmosphere under increased barometric pressure in a specific escape compartment of a building (staircase shaft), tunnel (pressurized escape tunnel) or other human-occupied structure that can be easily accessed by escapees at any time.

A method for producing and maintaining a breathable fire preventative, hyperbaric hypoxic atmosphere inside a human-occupied environment or escape compartment.

A method of extinguishing an ongoing fire in a building or tunnel by releasing such pressurized fire-extinguishing hypoxic atmosphere or composition from said escape compartment into an environment affected by fire. This allows to replacing rapidly the contaminated normoxic atmosphere in such environment with the human-breathable hypoxic fire-extinguishing atmosphere and suppressing any fire at once.

The provision of equipment that can produce the breathable hypoxic fire-extinguishing composition and store it under increased barometric pressure in a specific volume or an escape compartment. Such equipment employs the processes of molecular-sieve adsorption, membrane-separation, cryogenic separation and other oxygen extraction technologies.

The provision of the hypoxic hyperbaric fire extinguishing composition having an oxygen content ranging from 7% to 14% under increased barometric pressure up to 1 atmosphere above standard, which makes it absolutely safe for human breathing.

The provision of fire safety systems having hyperbaric escape compartments with hypoxic fire-suppressive atmosphere inside tunnels, buildings, mines and other public/industrial facilities. Such hyperbaric compartments become depressurized in case of fire and release the stored hypoxic atmosphere into an area affected by fire.

The provision of a building's system design with a pressurized staircase compartment.

The provision of a tunnel's system design with a pressurized escape compartment.

The provision of a fire safety system providing protection against biological and chemical hazard.

DESCRIPTION OF THE INVENTION

This invention is based on the Phenomenon of Ignition Suppression and Combustion Elimination in hypoxic breathable air and the Hypoxic Fire Prevention and Suppression System (FirePASS™), being described in previous patent applications and the physiological effect of counterbalancing hypoxia in human body by increasing environmental barometric pressure that leads to the increase of the partial pressure of oxygen in the inspired hypoxic air.

Hypoxic fire-preventative environments described in the earlier patent applications are perfectly suitable for a longterm human exposure in an atmosphere having oxygen content in the range from 14% to 16%. A hyperbaric fire-preventative environment can employ a much lower oxygen content that can be as low as 7%. For instance, at standard atmospheric pressure a human body can tolerate hypoxic air with an oxygen content of 7% (corresponding to an altitude of 8.3 km or partial pressure of oxygen at 71.05 millibar) only for a few minutes before the oxyhemoglobin saturation drops to a potentially dangerous level. However, the same 7% O2 hypoxic air becomes perfectly suitable for breathing at the increased barometric pressure of 1 atmosphere above the standard. The partial pressure of oxygen in such atmosphere will be 142.1 Mb (millibar), which corresponds to 14% of oxygen in the normobaric hypoxic air or an altitude of 3.25 km.

This physiological effect allows creating fire-safe compartments with human-breathable hyperbaric atmospheres having extremely low oxygen concentrations (from 7% to 12%) and without imposing any risk to human health. This hyperbaric hypoxic atmosphere can be used as a firepreventative environment in military bunkers, vehicles and submarines and as an extremely safe fire escape compartment in many civil applications.

Moreover, the hyperbaric hypoxic atmosphere can be used as a fire suppressant that upon its release from the pressurized fire escape compartment can flood an area affected by fire. This dual-function idea is employed in all embodiments provided further in this work.

Figure 1:
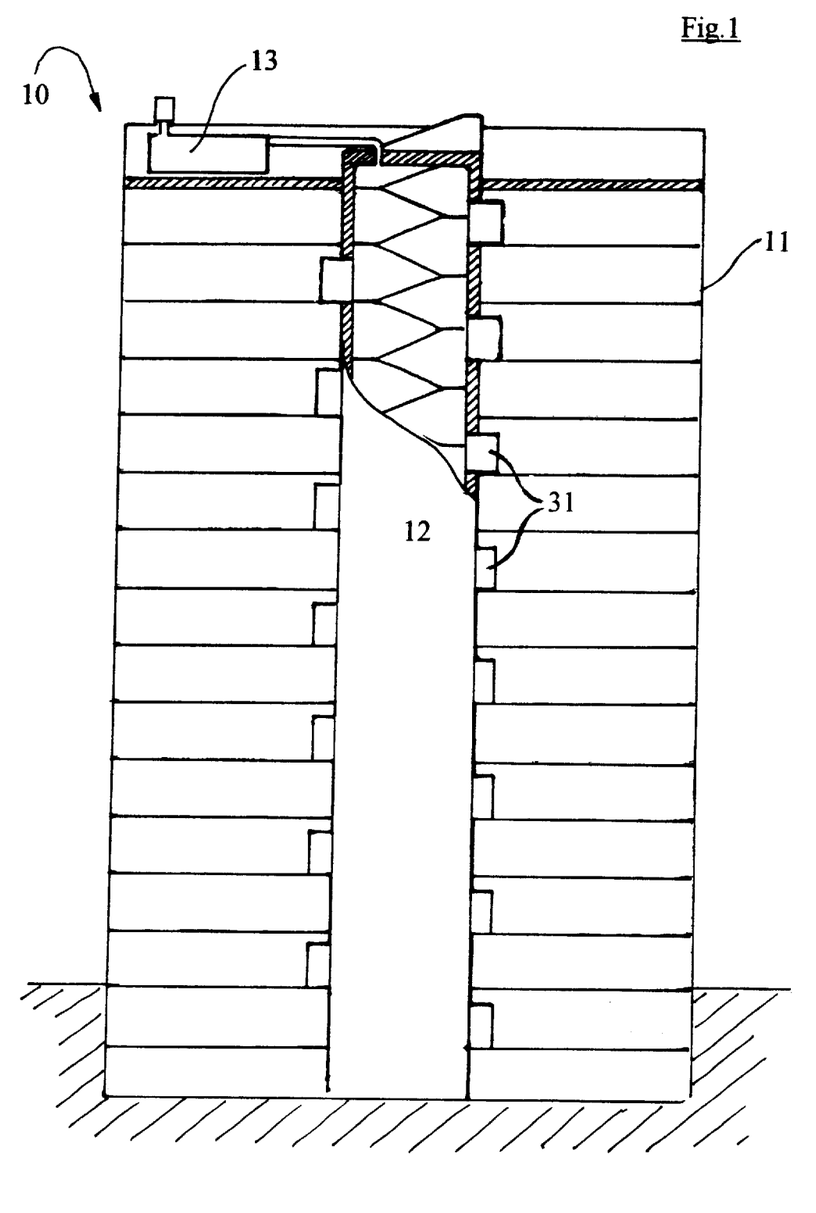
FIG. 1 presents a schematic view of a multilevel building having Hyperbaric Hypoxic Fire Escape and Suppression System (HHFESS).

FIG. 1 presents a schematic view of the first preferred embodiment 10 of the Hypoxic Hyperbaric Fire Escape and Suppression System (HHFESS) that is most suitable for various types of multilevel buildings and underground facilities.

A building 11 having a pressurized staircase shaft 12 is equipped with hypoxic generation station 13 communicating with the shaft 12 and maintaining in this shaft a hyperbaric atmosphere of hypoxic gas mixture. The hermetic staircase shaft 12 can be build as a monolith steel-reinforced concrete structure having an airlock or pressure-equalizing chamber 31 with two pressurized doors (32 and 33 on FIG. 3) at every floor. In order to access the staircase 12, a user must first open an external door and enter the airlock. After the external door is closed, the internal door opens slowly allowing the barometric pressure inside the chamber to equalize with the hyperbaric pressure inside the staircase shaft. The pressure equalization may be achieved also through a pressure relief valve in the internal door.

Figure 2:
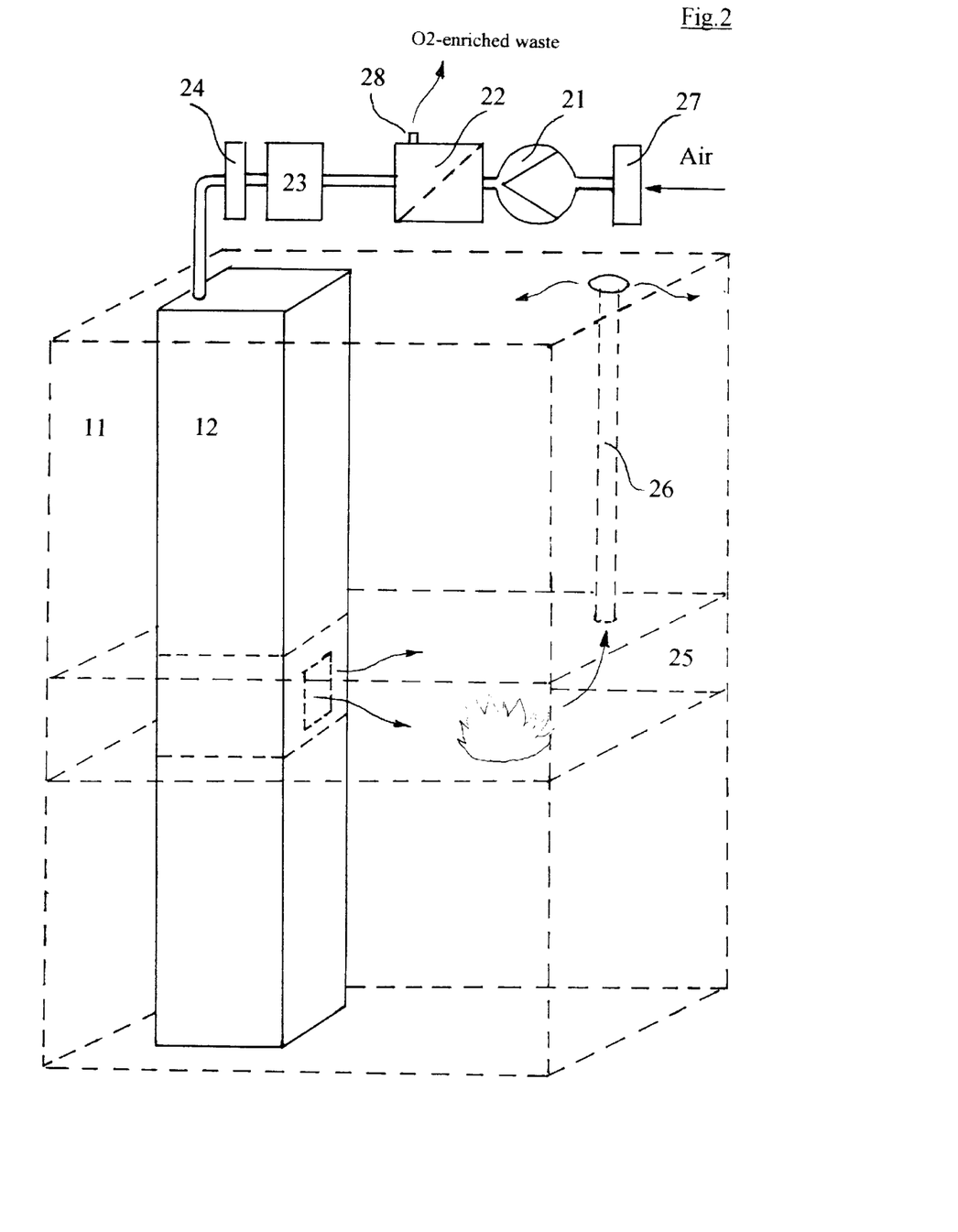
FIG. 2 illustrates schematically a working principle of the building's HHFESS.

FIG. 2 shows schematically the working principle of the embodiment 10. Compressor 21 intakes ambient atmospheric air through filter 27 and sends it in compressed form into air-separation module 22 where a part of oxygen is extracted. The oxygen-enriched gas mixture can be disposed into the atmosphere through outlet 28 or, preferably, send to a fuel-cell power plant that can generate electricity for the object needs. The product remaining after the oxygen extraction is an oxygen-depleted (hypoxic) gas mixture, containing 12% of oxygen and about 88% of nitrogen with traces of other atmospheric gases and moisture.

Oxygen-extraction technology is well known to those skilled in the art and air-separation module 22 may employ oxygen-enrichment membranes and pressure, vacuum or temperature swing adsorption processes, cryogenic distillation and other air-separation technologies. Suitable airseparation modules are available from FirePASS Corporation and Hypoxico Inc. in New York, and the working principles of these modules has been described in previous patent applications provided above. The biggest advantage of these modules is that they do not remove moisture and carbon dioxide from the ambient air during the separation process that are important for human respiration.

The hypoxic gas mixture is further transmitted into staircase shaft 12, wherein it is constantly kept under a desired positive pressure. An optional air-conditioning unit 23 can regulate temperature and humidity of the transmitted gas mixture and an additional HEPA filter 24 will provide its sterility.

The recommended barometric pressure is about 1 atmosphere above the standard atmospheric pressure at given altitude and can be lower or higher, if needed. The product with oxygen content of 12% becomes at this pressure perfectly safe for breathing for any amount of time since the partial pressure of oxygen it this hyperbaric environment will be 243.6 Mb, which is more than in ambient air at sea level (212.1 Mb). This means that the staircase can be accessed and operated normally at any time.

When fire is detected on floor 25, both doors leading to the staircase 12 on this floor open slowly releasing hypoxic atmosphere into the floor and allowing residents to escape into staircase 12. Hypoxic fire extinguishing composition replaces the normoxic atmosphere on the floor 25 that together with the combustion products is forced outside through the ventilation shaft 26. At this time all other ventilation equipment in the building must be shut down. The volume of the hypoxic composition released into the floor affected by fire will be equal to the internal volume of the staircase shaft, if previously kept under pressure of 1 atmosphere above the standard pressure. In most modern buildings this will be enough for total flooding of any floor and instant fire extinguishing. Buildings with larger floors should have multiple hyperbaric staircase compartments.

After the hypoxic composition is released and the barometric pressure in the staircase drops to near standard, the hypoxic generation station 13 (consisting of the units 21, 22, 23, 24 and 27) starts working in its highest capacity providing more hypoxic composition for the ventilation of the floor affected by fire. This process can continue for as long as needed until the fire source is located and eliminated. The hypoxic generation station 13 available from FirePASS Corporation can be assembled in a 40-foot shipping container and can supply up to 40 m3 per minute of the hypoxic fire-extinguishing composition with oxygen content of 14% that is recommended for the ventilation of the staircase 12 after in becomes normobaric.

Figure 3:
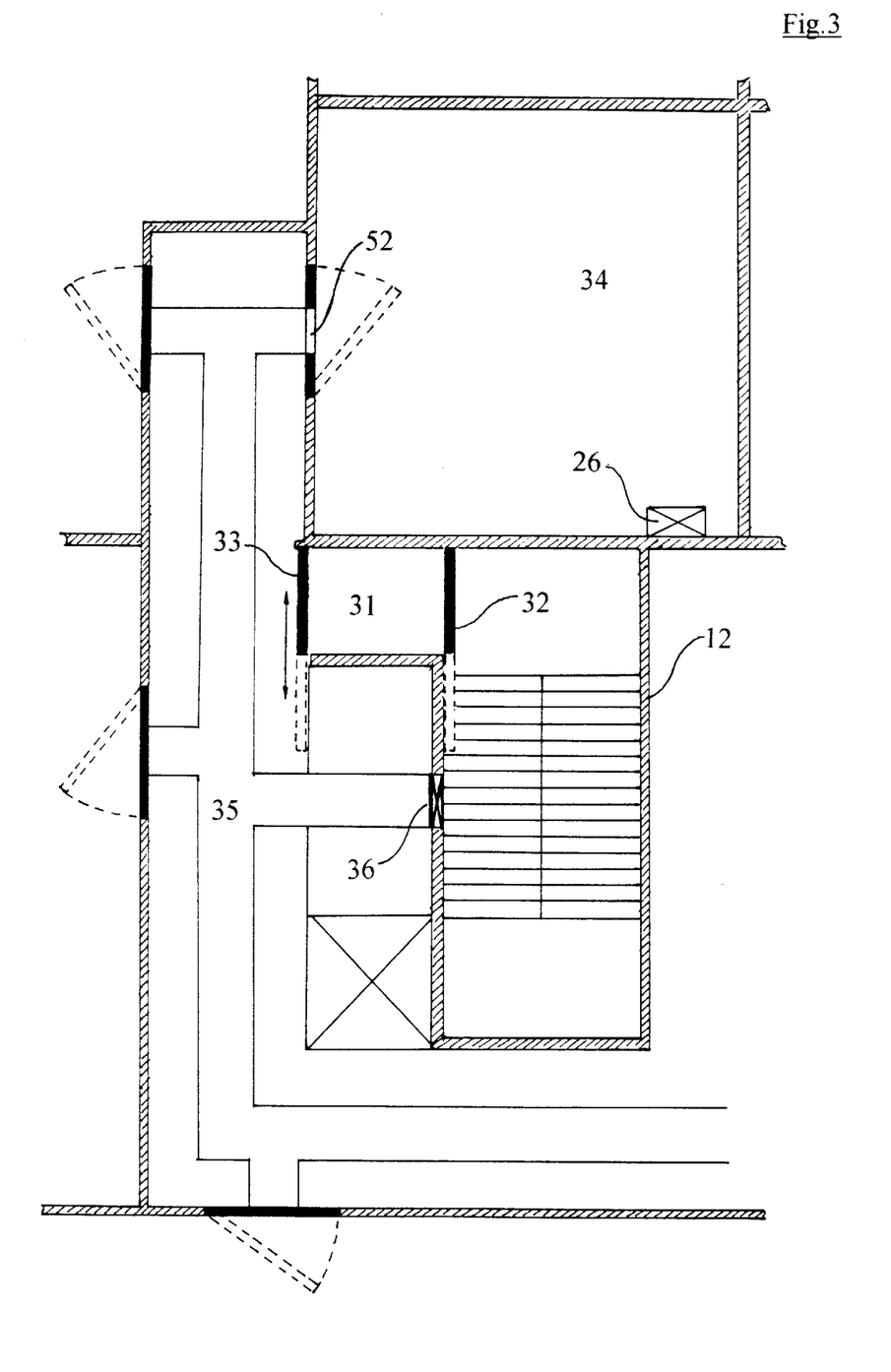
FIG. 3 presents a typical floor plan of a multilevel building having HHFESS.

A typical building floor plan is provided for better illustration on FIG. 3. The staircase 12 has a pressurization chamber or airlock 31 on each floor separated by hermetic internal door 32 and external door 33. It is advisable to make both doors of the sliding type in order to provide safe operation during a pressure equalization process that will take place during normal entry. When somebody needs to use the stairs 12, he or she would need to press a button on door 33 that will open automatically and close after the person enters the airlock chamber 31. The pressure inside chamber 31 becomes equalized with the hyperbaric pressure inside staircase 12 through a special relief valve or simply by depressurizing door 32. The door 32 opens and the person can enter the staircase 12. The same procedure applies in reverse when someone wants to enter a floor from the staircase 12. The door 32 opens automatically after the "open" button is pressed and chamber 31 equalizes its pressure with compartment 12, and a person can enter the chamber 31. Door 32 closes and some internal air is released into the floor in order to equalize the pressures, after which the door 33 opens allowing the floor entry. All doors can be also operated fully automatically by a signal from a motion detector or an optical sensor detecting a person approaching a door. All staircase entries should be monitored by a building security via video cameras.

The fire-suppressive atmosphere inside a staircase of apartment and office buildings during normal operation should contain 12% oxygen that will provide even higher partial pressure of oxygen than the ambient air at the gauge pressure of 1 atmosphere. Lower pressures can be used in many applications as well. For instance, an internal gauge pressure of 0.5 atmospheres (or absolute pressure of 1.5 atm) will provide 182.7 millibar of oxygen partial pressure, which corresponds to an absolutely safe altitude of 1200 meters. In some applications, a staircase can be kept at a minor positive pressure that will not require an airlock for entry—just one hermetic or semi-airtight door would suit in this case.

When fire is detected in any room or apartment on the floor, both doors 32 and 33 open slowly releasing hyperbaric hypoxic atmosphere into the floor and flooding it completely. In modern buildings there are always small gaps under the doors that will allow hyperbaric hypoxic composition to enter into each unit while forcing the internal ambient atmosphere out through the ventilation shafts 26.

Figure 4:
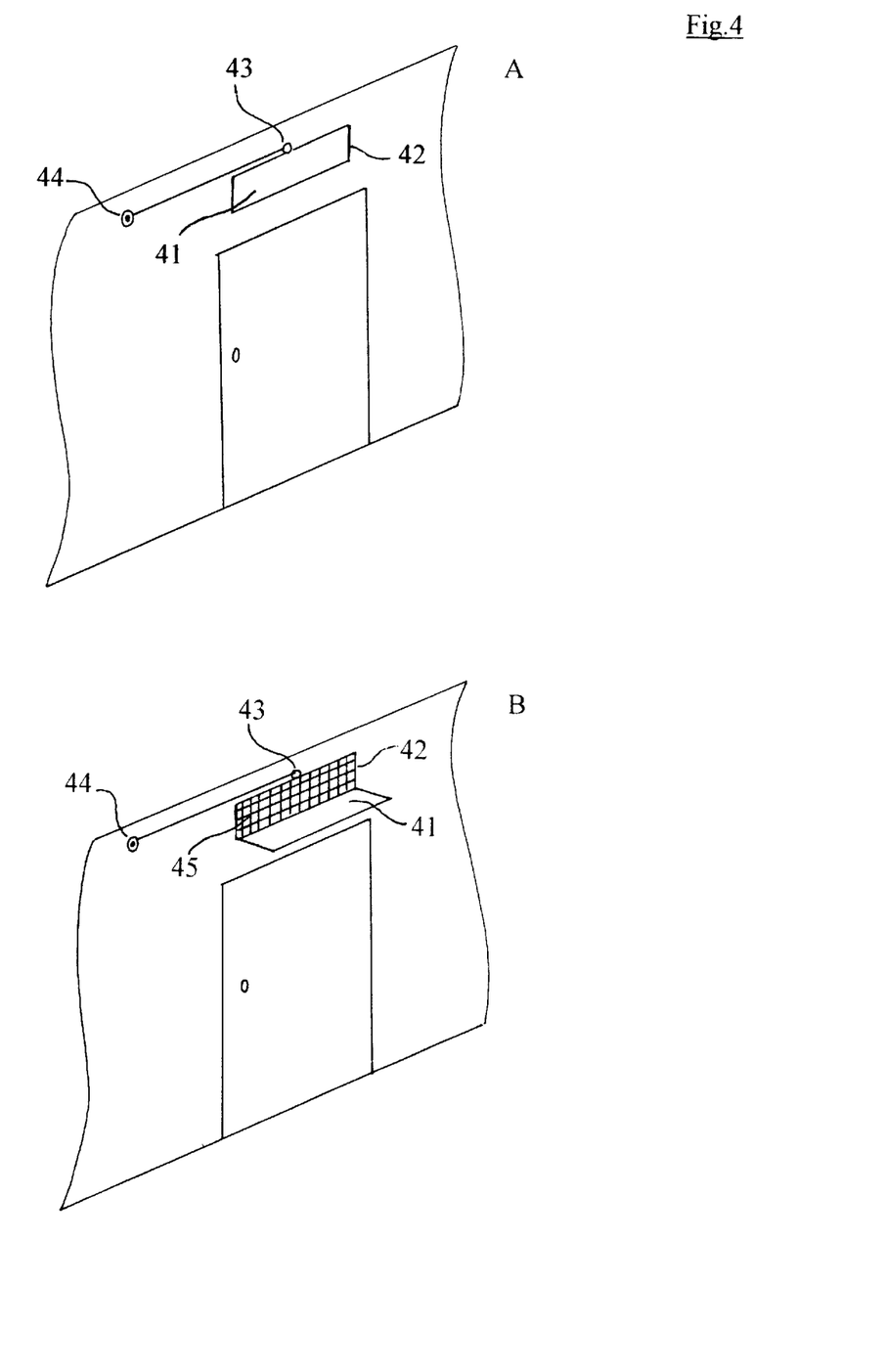
FIG. 4A presents a schematic view of an emergency ventilation port—normally closed.
FIG. 4B presents a schematic view of the emergency ventilation port during fire emergency.
Figure 5:
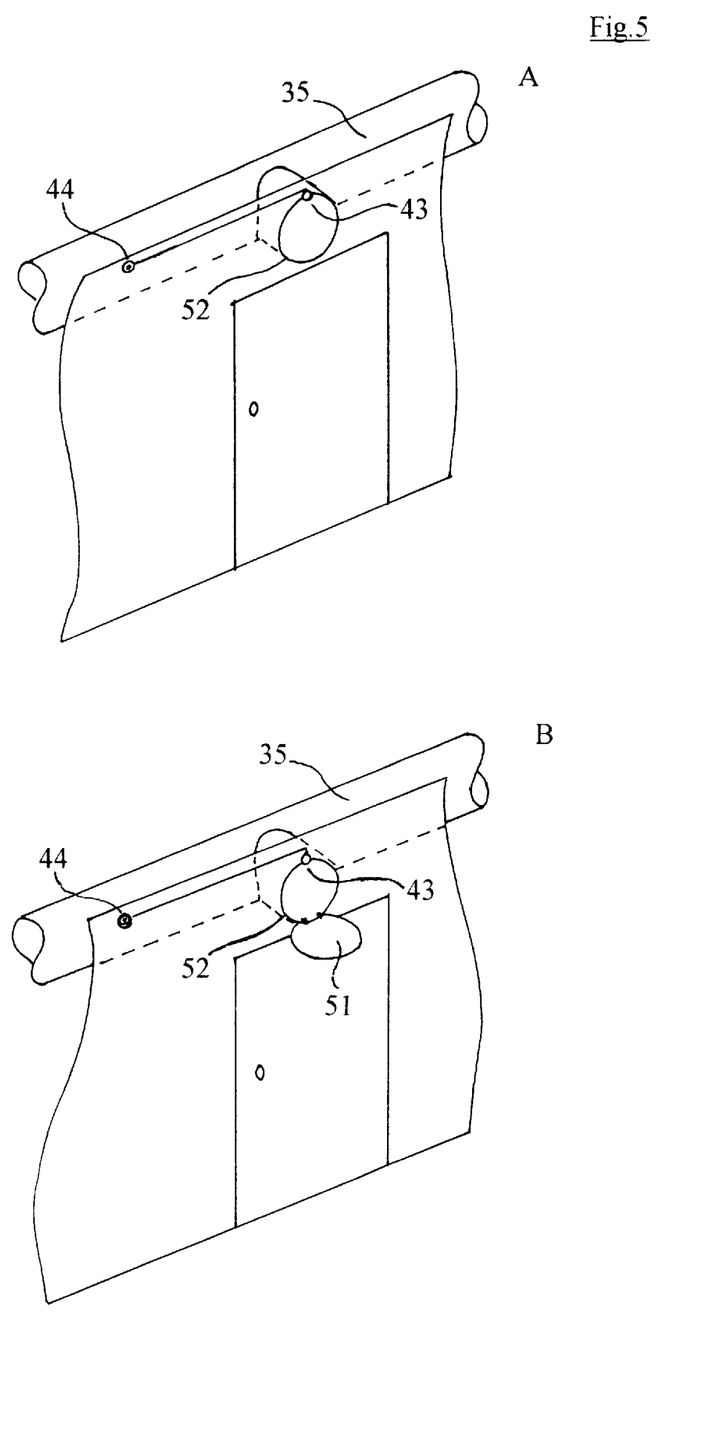
FIG. 5A presents a schematic view of an emergency ventilation duct—normally closed.
FIG. 5B presents a schematic view of the emergency ventilation duct during fire emergency.

The fire-suppression performance of the system can be improved significantly by installing a special emergency ventilation port 42 or ventilation duct 35 above each door on a floor, as shown on FIGS. 4 and 5 (viewed from the inside of a room). Cover 41 of the emergency ventilation port 42 is normally closed by a locking device 43 that can be unlocked automatically by a signal from a fire/smoke detector 44. From the outside the port 42 is protected from intrusion by a strong metal mesh or grid 45 that allows air through when cover 41 opens.

In case of a fire, detector 44 sends a signal that opens port only in the fire affected unit or apartment 34. This will allow the hypoxic composition released from staircase 12 to flood the unit 34 rapidly and extinguishing any ongoing fire completely, while providing breathable atmosphere for occupants. An open or broken (e.g. by explosion) window will only help to replace the normoxic atmosphere with the hypoxic fire-extinguishing composition faster. Outside air will not be allowed in since the hypoxic generation station 13 will provide sufficient flow of the hypoxic composition in order to constantly maintain positive pressure inside the building and particularly in the floor affected by fire. An escape route to the staircase 12 can be easily found even in a total darkness just by walking against the air current.

A signal from detector 44 is also transmitted to the main security system of the building, which will expose the location of fire immediately and allow backing up the operation of doors 32 and 33 and module 13.

The locking device 43 can be made as an electromagnetic lock that opens when current is applied or cut off. The most preferred device should have an electro-explosive or pressurized gas actuator that would simply let off the cover 41. The actuators can be similar to those used in automobile airbags and are available from a number of manufacturers including FirePASS Corporation.

The following calculations will prove the effectiveness of the HHFESS. A 30-story building with a floor size of 500 m2 would have a floor internal air volume of about 1000 m3. Two staircases (required in such buildings by fire safety standards) would have a total air volume of 2000 m3 (provided they have at least 2 floors below ground). This means that at a gauge pressure of 1 atmosphere both staircases would contain additional 2000 m3 of hypoxic composition ready to be released in case of a fire at any floor. 2000m3 of hypoxic composition with 12% oxygen content can produce over 3600 m3 of the hypoxic fire-extinguishing composition with 14.5% O2 by mixing with the ambient air. This amount is more than sufficient to flood any floor affected by fire, regardless of the hypoxic composition loss through the ventilation and elevator shafts. Any fire would be extinguished immediately and the hypoxic fire-suppressive atmosphere will be maintained at a positive pressure for as long as needed by the hypoxic generation station 13.

A hyperbaric staircase atmosphere at a gauge pressure of 0.5 atmospheres will still produce 1500 m3 of hypoxic composition with 12% O2 or 2700 m3 of hypoxic composition with 14.5%, which would be sufficient for the building with a 1000 m3 floor.

As an alternative solution shown on FIGS. 5A and 5B, emergency ventilation port 52 can be connected to an emergency ventilation duct 35 (as shown on FIG. 3) that can be installed between staircase 12 and unit 34 (and all other units on the floor) in order to provide direct discharge and efficient flooding of a unit on fire with the hypoxic fire-extinguishing composition. In this case, in addition to locking device 43, a locking device with a gas release valve 36 will be installed in order to provide an airlock-type assembly of the duct 35. Both locking devices 36 and 43 will be initiated to open by a signal from detector 44 and/or control panel 61 allowing hypoxic composition to flow directly into a unit affected by fire. In this case there will be no need to open both doors 32 and 33 simultaneously and to flood the whole floor. The hypoxic composition at hyperbaric pressure will rapidly flood the whole unit 34 extinguishing any ongoing fire promptly.

This alternative solution is more cost-effective since only a small portion of the hypoxic composition will be used from its storage in hyperbaric staircase 12 and will need to be regenerated by hypoxic generator station 13, the size and capacity of which can be reduced substantially. Moreover, multiple fires in different units and on different floors can be extinguished simultaneously, which may be needed during an earthquake, wildfire, war or a terrorist attack.

This solution also allows to substantially reduce the initial hyperbaric pressure inside staircase compartment 12 to the range from 1.01 to 1.1 atmospheres of absolute pressure or from 0.01 to 0.1 atm of gauge pressure and to use much lighter airlock doors 32 and 33.

Figure 6:
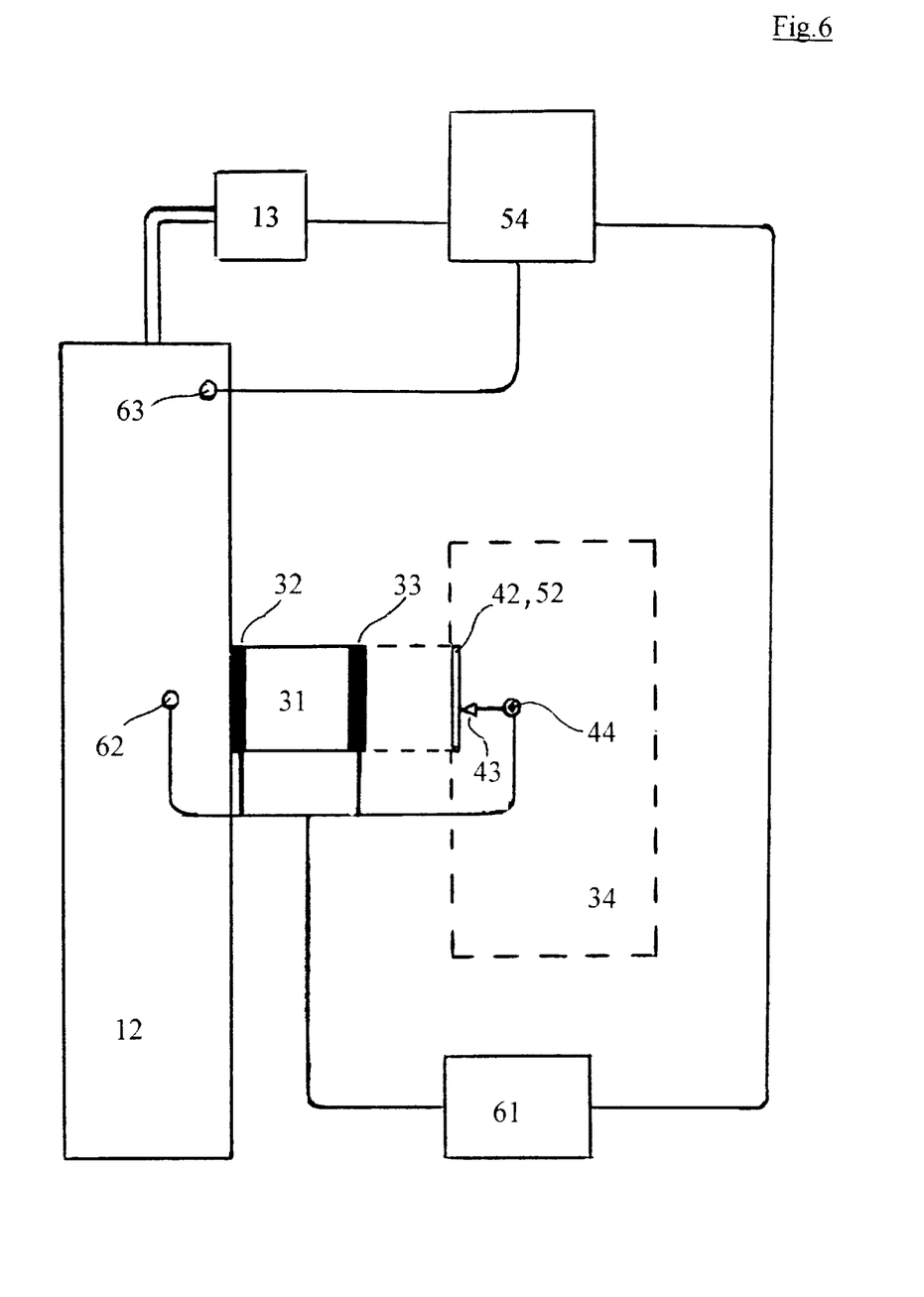
FIG. 6 shows schematically an interaction of all major components of the building's HHFESS.

FIG. 6 illustrates schematically the working principle of the HHFESS having main computerized control station 61 on the ground floor. When a fire starts in apartment 34, the fire/smoke detector 44 sends a signal to the computerized control station 61 and locking device 43 that opens the emergency ventilation cover 41 (or both 43 and 36, if an emergency ventilation duct 35 is installed as shown on FIG. 3 and 5). At the same moment both doors 32 and 33 depressurize and open gradually, allowing hypoxic fire-suppressive atmosphere into the floor. Alternatively, when duct 35 is installed, doors 32 and 33 stay pressurized and hypoxic composition is released directly into unit 34. A video camera 62 helps to monitor the situation and exit of residents from the floor. Even if, for some reason, the station 61 becomes inoperable, the floor residents will be able to open both doors 32 and 33 manually using an emergency feature.

As both doors 32 and 33 (or alternatively, valve 36) open, the pressure inside the staircase 12 drops rapidly, which at certain point (e.g. 0.1 atm) is detected by a pressure transducer 63 that turns on the hypoxic generation station 13 and a back-up power generator or fuel cell 64. Power generator 64 will produce a sufficient amount of electricity to power for at least several hours all of the building's emergency systems including hypoxic generator station 13 and control unit 61. All other ventilation equipment in the building must be shut down.

After hypoxic composition being released into a floor or a unit affected by fire and barometric pressure inside staircase compartment 12 drops to near standard level, all external airlock doors 33 open in the whole building allowing easier entry through one internal door that can be opened by a signal from an optical sensor or a motion detector initiated by an approaching person.

A further important feature of the Building HHFESS is its ability to provide adequate protection against biological and chemical warfare agents. Firstly, the hyperbaric environment in the staircase 12 provides constant safety against a fire, smoke, biological and chemical contaminants, since:
  nothing can be ignited inside making combustion impossible
  smoke from a floor cannot get in due to a constant pressure difference
  biological and chemical agents are filtered out by a the intake filter 27 and additionally can be destroyed by the heat of the compressor 21; a supplementary HEPA/carbon filter 24 provides an additional sterilization and safety for the system.

Secondly, in case of a chemical or biological attack (that can be detected by special sensors installed with the filter 27) the HHFESS can convert the whole building into a protective zone by simply opening all pressurized doors. This will provide a safe positive pressure inside the building that will be maintained by the hypoxic generator station 13. All other ventilation equipment must be shut down in this case too.

Figure 7:
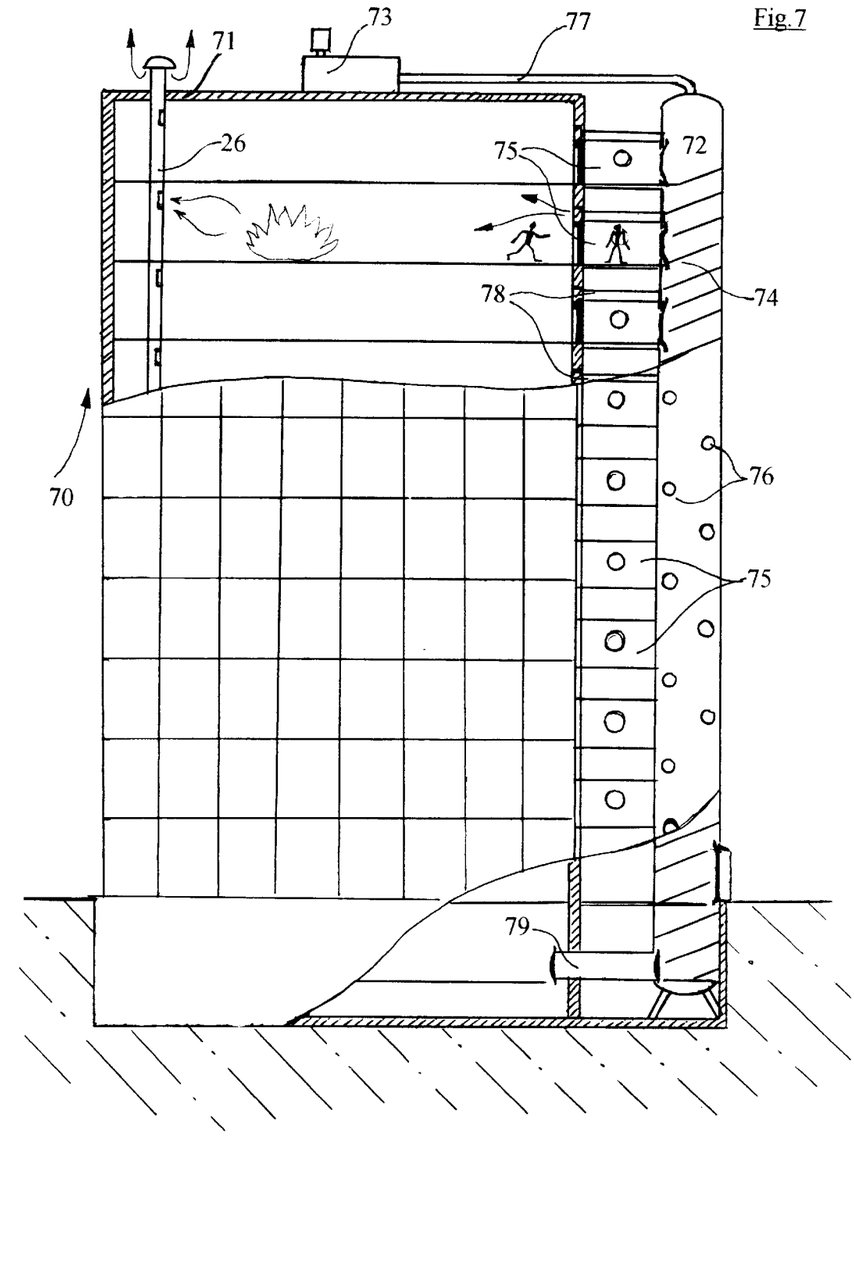
FIG. 7 illustrates schematically a working principle of the building's HHFESS having external hyperbaric staircase compartment with enclosed escape bridges.
Figure 8:
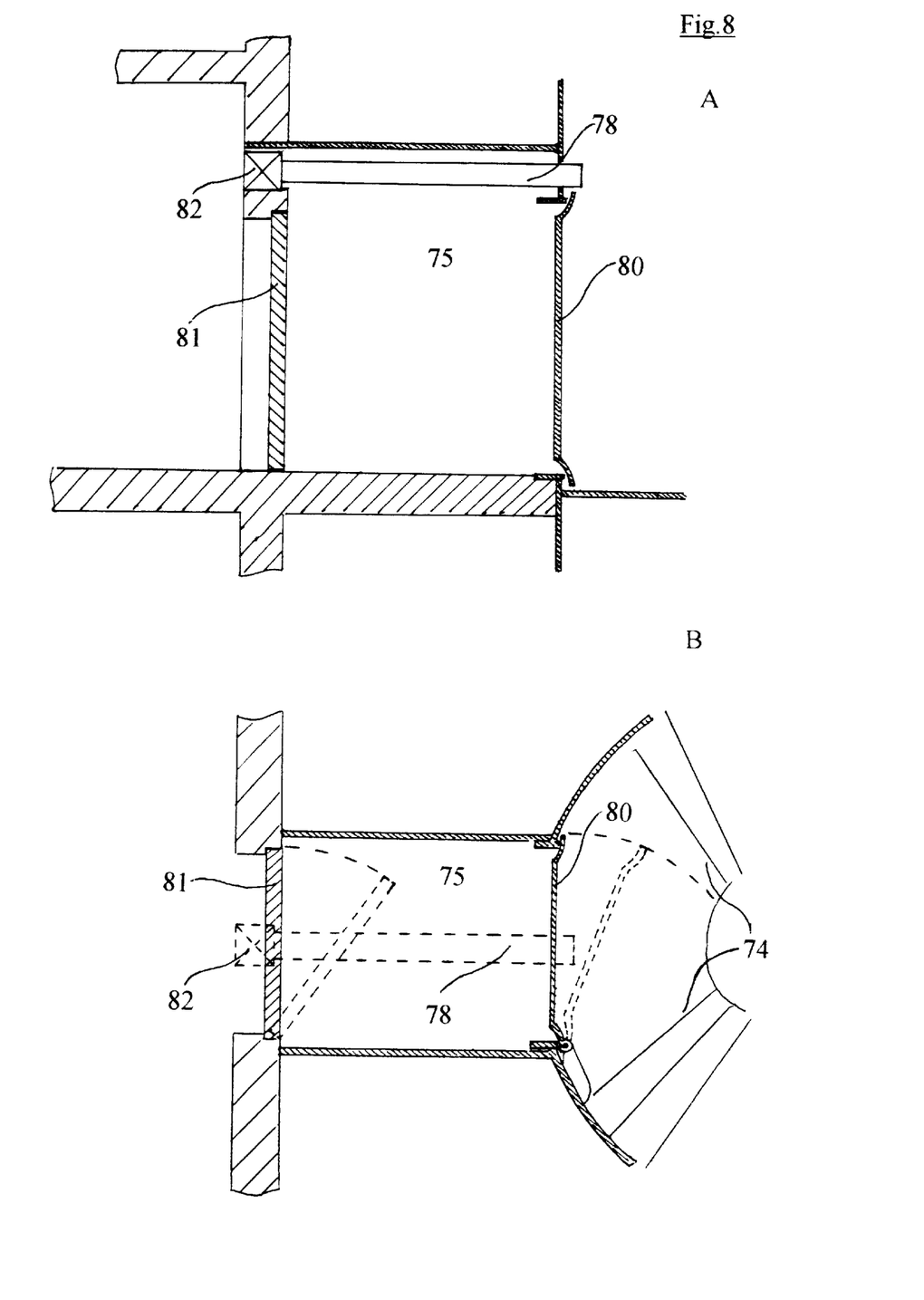
FIG. 8A shows a frontal view of an escape bridge between external staircase compartment and building.
FIG. 8B shows a plan view of an escape bridge between external staircase compartment and building.
Figure 9:
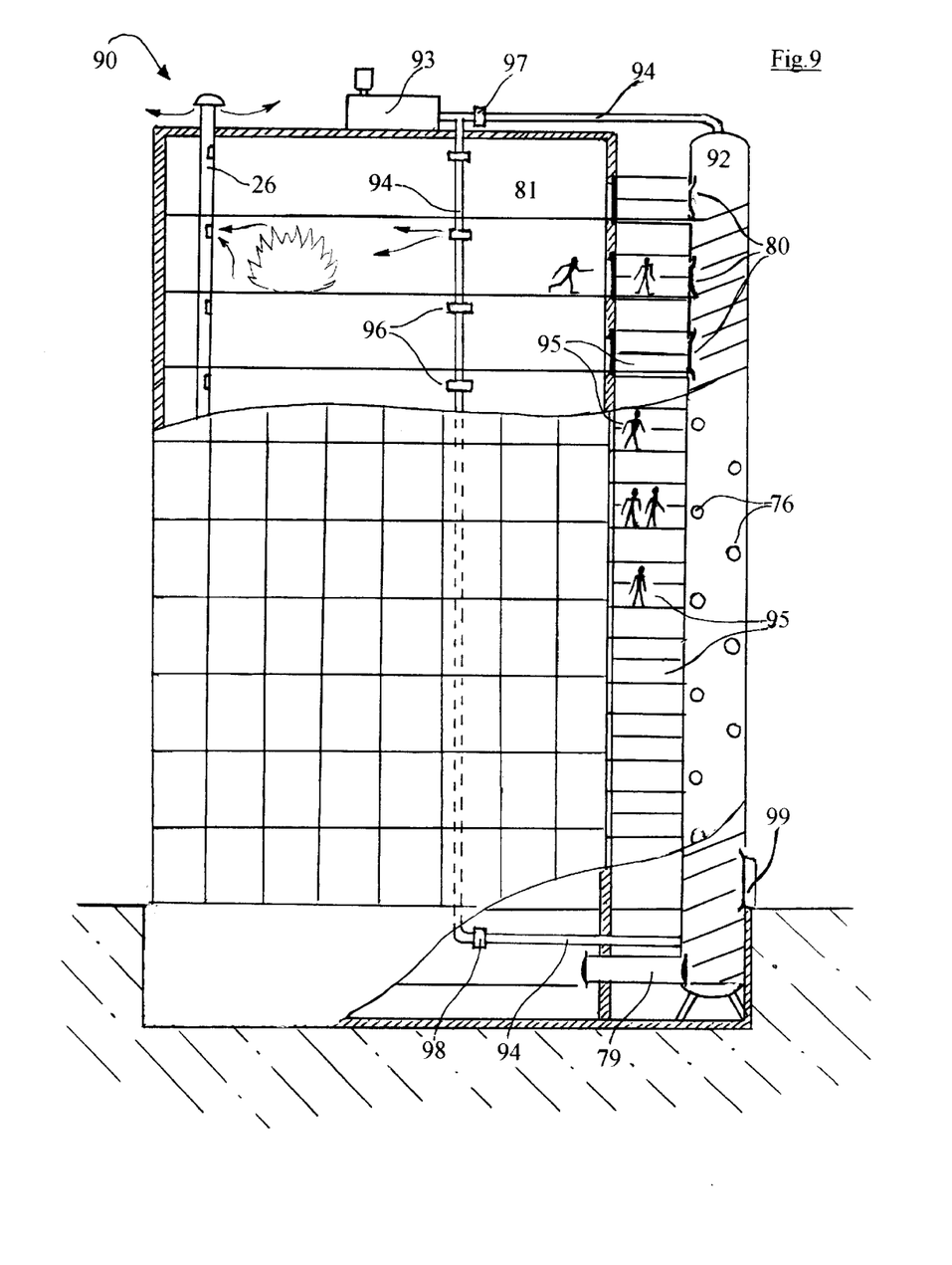
FIG. 9 shows an alternative embodiment of the building's HHFESS having external hyperbaric staircase compartment with open-air escape bridges.

FIGS. 7, 8 and 9 present the most practical and cost-effective embodiments of HHFESS that can be installed at any existing high-rise building or incorporated in new projects.

Building 71 shown on FIG. 7 having an external HHFESS compartment 72 that can be easily assembled from steel pipe elements used in natural gas and oil industry. An escape staircase 74 is assembled inside staircase shaft 72 from light steel elements. Compartment 72 is communicating with every floor of building 71 through semi-airtight escape bridges 75 having a standard semi-airtight entry door 81 on the building side and a hermetic pressurized compartment door 80. The door 80 must be strong enough to withhold internal compartment pressure, which is constantly maintained at 5 atmospheres of higher, if desired.

Hypoxic generator station 73 initially creates an internal hypoxic atmosphere inside compartment 72 that is further constantly maintained at 5 atm gauge pressure. The recommended oxygen concentration in this hypoxic atmosphere is 12%.

The most recommended 5 atm pressure inside compartment 72 would apply 100 metric ton pressure on the door 80, which will make it absolutely inaccessible during normal operation. A maintenance or inspection worker can still access compartment 12 through a depressurization chamber 79, however he would have to spend several hours in this chamber before he can get out, exactly as it is required for divers returning from the 50 meter depth.

Additionally, compartment 72 is communicating with a floor of building 71 through a gas release pipe 78 having a gas release valve 82 on the end. Valve 82 is preferably a burst disc type device having an electro explosive actuator initiated by a signal from the fire detecting system. A simple air siren can be installed on valve 82 in order to warn residents in case of a fire emergency.

When fire is detected, valve 82 opens releasing hypoxic fire-suppressive composition from compartment 72 into the floor affected by fire. A gas distribution piping, similar to 35, can be installed throughout a floor for more precise delivery of fire-suppressive composition into a room or an area affected by fire. Alternatively, emergency ventilation ports 42 can be installed at any room on a floor. Breathable hypoxic fire-suppressive composition will rapidly replace the internal floor atmosphere that will be forced out through a ventilation shaft 26. The internal pressure in compartment 72 drops to near standard and hermetic escape doors 80 becomes open on every floor. This can be easily accomplished by inserting springs into the doorframe that will push the door open when internal pressure drops or by using memory-shape gasket from a polymer or composite material. A standard door spring or other closing device can open doors 81 any time and close automatically.

At the same time hypoxic generator 73 starts its operation providing about 40 m3 of hypoxic air with oxygen content of 14%, most of which will be directed through an open pipe 78 into the floor affected by fire. A fire-safe hypoxic atmosphere will be maintained in staircase compartment 72 and its positive pressure will guarantee that no smoke or fire will get in. Building occupants can walk down the stairs 74 into lobby or basement and leave the building 71. Submarine-type illuminators 76 will provide day light into compartment 72 that also has to be equipped with an emergency light supply.

The amount of the breathable hypoxic fire-suppressive composition that can be discharged from a 30-story staircase compartment 72 having 4 meters in diameter would be about 5000 m3, provided it was kept under 5 atm pressure.

FIGS. 8A and 8B show escape bridge 75 in a frontal and plan view accordingly. Gas release pipe 78 is installed above the doors 80 and 81 and is blocked by the gas release valve 82.

FIG. 9 shows an alternative HHFESS embodiment 90 having external hyperbaric compartment 92, similar to 72, and communicating with building 91 through a pressurized piping circuit 94 having a vertical gas distribution pipe with gas release nozzles 96. Nozzles 96 are equipped with gas release valves, similar to 82, and can be actuated by a signal from a fire detection system, in which case the hyperbaric hypoxic composition contained in compartment 92 under pressure of 5 or more atmospheres is released into the floor or room affected by fire. A significant benefit of the use of hyperbaric composition is that upon release it becomes very cold due to depressurization, which will help to suppress fire by additional thermal absorption. As soon as the pressure in the system 92–94 drops, automatic valves 97 and 98 close and hypoxic generator 93 starts pumping hypoxic air with 14% O2 through the vertical part of pipe 94 and open nozzle 96 into the same floor maintaining breathable fire-extinguishing atmosphere for as long as needed.

At the same time pressurized doors 80 becomes open and building's residents may escape into staircase 92 through door 81 and an open-air bridge 95. Staircase compartment 92 rapidly becomes normoxic since ambient air will freely access it through the open doors 80, and escapees may safely walk down the stairs, while breathing ambient air, and exit compartment 92 through door 99.

Figure 10:
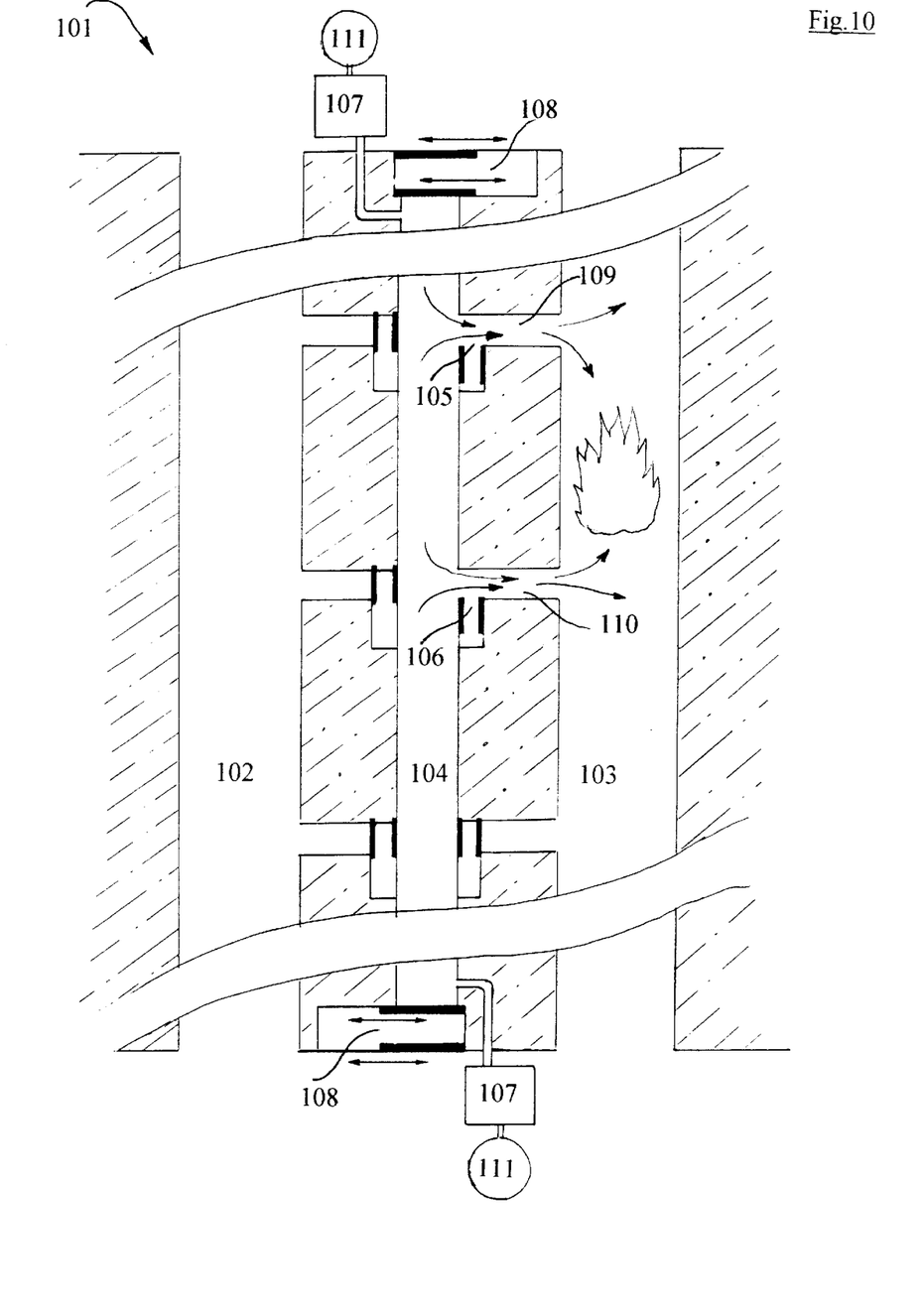
FIG. 10 presents a schematic view of the invented system for transportation tunnels.

FIG. 10 presents HHFESS for a transportation tunnel system 101 having two main transportation tubes 102 and 103 and a service tunnel 104. Main tubes 102 and 103 are open at their ends for traffic. Tube 104 is build as a hermetic structure pressurized up to 1 atmosphere or higher, if needed. All entries into the tube 104 are equipped with hermetic airlocks (e.g. 105, 106 and 108) having accordingly two pressurized doors each. Hypoxic generator stations 107 produce hypoxic air sufficiently to keep the tube 104 under barometric (gauge) pressure of 1 atmosphere above the standard at given altitude. Emergency storage containers 111 hold supplementary amounts of hypoxic air at much higher (up to 500 atm) pressure in order to provide additional safety in case of multiple fires in different tubes of a tunnel network or natural disasters. When needed these supplementary amounts of hypoxic air can be released through a pressure reducing device into tunnel 104. The hypoxic air or fire-extinguishing composition inside service tunnel 104 contains 10% of oxygen, which provides at 1 atm pressure a safe human-breathable environment with a near normal partial pressure of oxygen at 101.5 Mb, corresponding to a normobaric oxygen concentration of 20% or an altitude of only 350 meters. Tunnel 104 can be entered or exited through the airlock doors 108 and can be normally operated as a service tunnel providing access for maintenance crews to different parts of the tunnel network. In some applications the oxygen concentration may vary from 7% to 14%, which would correspond to normobaric concentrations from 14% to 28%, being perfectly suitable for breathing.

The Tunnel HHFESS 101 can be easily applied to the existing Eurotunnel since it already has a pressurized service tunnel designed for 1 atm of gauge pressure and having corresponding airlocks with hermetic doors. The only work that needs to be done to install HHFESS is to replace current gigantic blowers that maintain 1 atm pressure in the service tunnel with the hypoxic generation stations 107 that would maintain hyperbaric hypoxic atmosphere inside.

The working principle of the Tunnel HHFESS 101 is similar to the Building HHFESS. When fire is detected in tunnel 103, the nearest airlocks 105 and 106 open both doors automatically (by a signal from the main control center) allowing hyperbaric hypoxic composition to exit and flood the tube 103 or its part affected by fire. The ventilation of the tunnel 103 (if any provided) and all traffic must be stopped simultaneously. Even if the volume of the service tunnel 104 were only a half of the tunnel 103, the amount of the released hyperbaric hypoxic composition would produce fire-extinguishing composition with 15% oxygen content in a quantity equal to the volume of the tunnel 104. This will guarantee that any fire will be extinguished within a few minutes, while providing commuters with a safe breathable atmosphere.

At the same moment hypoxic generation stations 107 would start producing hypoxic air with O2 content of preferably 14%–15% and in quantities sufficient to keep positive pressure in the tube 103. This will permit keeping an absolutely safe human-breathable fire-suppressive atmosphere for as long as needed. Trapped passengers may escape the tunnel 103, via connecting tubes 109 and 110, and get into safety of the tunnel 104 just by walking against the flow of the fresh hypoxic air, which would be possible even in a total darkness that may occur after an explosion. Escape tunnels 109, 110 and service tunnel 104 should be equipped with sufficient amount of respiratory support means, in order to provide supplemental oxygen to all possible escapees. The most valuable advantage of the invented HHFESS is its unique quadruple functionality:

1. Full accessibility and function during normal operation as service area having safe breathable atmosphere with near normal partial pressure of oxygen.
2. Instant suppression of an ongoing fire through the release of the stored breathable hyperbaric hypoxic fire-extinguishing composition into an area affected by fire.
3. Providing a totally safe fire escape area with the absolute guarantee that no fire or smoke can get in.
4. Providing continuous adequate protection against chemical or biological agents by converting a whole building or a tunnel into a positive pressure area.

Breathable hyperbaric hypoxic fire-suppressive environments can also be used in an underwater station, submarine, tank or other military vehicle or marine vessel. An increased barometric pressure inside such human-occupied compartments permits keeping oxygen concentrations at extremely low levels (e.g. 7%–10%), while providing near normal partial pressure of oxygen in the internal atmosphere. This will allow providing great fire safety and significantly decreasing a risk of fire from an internal detonation or a penetration of a fire-initiating projectile.

What is claimed is:

1. A hyperbaric hypoxic fire safety system for buildings, transportation tunnels and other human-occupied environments, said system comprising:

a pressurized compartment having a hypoxic atmosphere inside at a pressure higher than standard atmospheric pressure at the installation altitude;

said hypoxic atmosphere being a breathable hyperbaric hypoxic fire-extinguishing composition having an oxygen content in the range from 7% to 14%;

an apparatus supplying said compartment with the hypoxic composition and constantly maintaining a hyperbaric pressure inside; said composition being filtered from dust particles, biological and chemical contaminants;

said compartment having multiple entries, each with an airlock or a door, and selectively communicating trough said entries with an adjacent normobaric environment and providing an access in both directions;

said hyperbaric hypoxic composition being released from the compartment into said adjacent environment in case of a fire in order to extinguish it by replacing an ambient air in said adjacent environment with a breathable fire-extinguishing atmosphere being created as a result of the air mixing and replacing process.

2. The system according to claim 1 and
said apparatus being a hypoxic generator station consisting of an air compressor and an oxygen-extraction device; said hypoxic generator station processing ambient atmospheric air by filtering it from contaminants and extracting a part of oxygen from it and providing an oxygen-reduced gas mixture into said compartment at an increased pressure; said oxygen-reduced gas mixture having comfortable temperature and humidity provided by an air-conditioning unit.

3. The system according to claim 2 and
said oxygen-extraction device employing an oxygen-enrichment membrane, molecular-sieve adsorber or cryogenic air separator in order to extract a part of oxygen from ambient air.

4. The system according to claim 1 wherein
said airlock having at least two pressurized hermetic doors, one on each side; normally said doors open selectively allowing entry via standard airlock operation; said airlock doors open simultaneously in a fire affected floor or a part of a tunnel by a signal from a fire detector or a control station and releasing the hyperbaric hypoxic composition from said compartment into the floor affected by fire;

after the hypoxic composition being released into a floor affected by fire and a barometric pressure inside said pressurized compartment drops to near standard level, all external airlock doors open in the whole building allowing easier entry through an internal door that can be opened by a signal from an optical sensor or a motion detector initiated by an approaching person.

5. The system according to claim 1 wherein
said hypoxic fire-extinguishing composition being released in case of a fire directly into a unit or room affected by fire, said release is provided via an emergency ventilation conduit connecting said pressurized compartment with a unit or room affected by fire; said conduit being normally closed on one or both ends by a closing device that can be opened by a signal from a fire detector or control station; the release of the hypoxic composition can be provided into several units simultaneously in order to extinguish possible multiple fires.

6. The system according to claim 1 wherein
in order to provide continuing adequate protection for a whole building or tunnel in case of a biological or chemical warfare, said hypoxic composition being released into multiple parts of the building or tunnel and establishing a positive pressure inside that is maintained further by said apparatus that continuously supplies sufficient flow of said composition; said composition being produced from an ambient atmospheric air cleaned from chemical and biological contaminants by special intake filters and being additionally sterilized by a high-efficiency outlet filter.

7. The system according to claim 1 wherein
a normal operation pressure inside said compartment is maintained at a level from 1 to 6 atmospheres of absolute atmospheric pressure or up to 5 atmospheres of relative gauge pressure; said pressure can be increased in some applications.

8. The system according to claim 1 wherein
said compartment being a staircase shaft of a building and said adjacent normobaric environment being the remaining part of the building; said staircase having multiple entries leading to each floor or section of the building.

9. The system according to claim 1 wherein
said compartment being an external staircase shaft of a building and said adjacent normobaric environment being a floor or a floor unit of the building; said staircase shaft having pressurized doors communicating with each floor or section of the building through multiple escape bridges; said pressurized door open automatically when pressure inside said compartment drops to near standard atmospheric pressure.

10. The system according to claim 1 wherein
after said hyperbaric composition being released from said compartment, said hypoxic atmosphere becomes near normobaric and is kept hypoxic further at a minor positive pressure by said apparatus.

11. The system according to claim 1 wherein
after said hyperbaric composition being released from said compartment, its internal atmosphere becomes normobaric and normoxic and said apparatus supplying said hypoxic composition into said adjacent environment.

12. The system according to claim 1 wherein
said compartment being an escape tunnel selectively communicating with said adjacent normobaric environment being a main-use tunnel or a tunnel network.

13. The system according to claim 1 wherein
said compartment being a part of a human-occupied environment having said adjacent normobaric environment as a main-use area.

14. The system according to claim 1 wherein
said compartment being a human-occupied environment inside an underwater structure, submarine, military vehicle or other hyperbaric structure.

15. A fire escape and suppression system for buildings, said system comprising:
a pressurized staircase compartment having an internal hyperbaric atmosphere therein at an absolute pressure in the range from 1 to 2 atmospheres; said internal atmosphere consisting of a hypoxic air having oxygen content below 14%;

said hyperbaric compartment selectively communicating through airlock means with multiple normobaric human-occupied compartments containing an ambient air at standard atmospheric pressure and, when needed, releasing said hypoxic air into selected normobaric compartment(s) in order to create a fire-extinguishing atmosphere inside by mixing with and replacing said ambient air; a hypoxic air generation device supplying said hyperbaric compartment with the hypoxic air and constantly maintaining a hyperbaric pressure inside;

said hypoxic air generation device producing the hypoxic air from ambient atmospheric air by means of extracting from it a part of oxygen;

said hyperbaric atmosphere being a breathable fire-extinguishing composition having an oxygen partial pressure at a safe human-respiration level;

said staircase compartment being accessible at any time for normal staircase operation or for maintenance work;

an emergency ventilation conduit for transmitting said fire-extinguishing composition into a normobaric compartment affected by a fire; said ventilation conduit being closed during normal operation by a closing means that can be released by a signal from a fire detection system;

said fire detection system comprising multiple fire and smoke detectors installed in each room of the building and a main control panel communicating with the detectors, said closing means, airlock doors locking devices, said hypoxic air generation device and a back-up power supply unit.

16. The system according to claim 15 wherein said emergency ventilation conduit being an aperture in a wall of said human-occupied compartment, normally closed with a lid having a locking device that can be unlocked by a signal from said fire detection system.

17. The system according to claim 15 wherein said emergency ventilation conduit being a ventilation duct leading from said staircase into said human-occupied compartment, said duct being normally closed with at least one lid having a locking device that can be unlocked by a signal from said fire detection system.

18. The system according to claim 15 wherein said hyperbaric atmosphere having an oxygen partial pressure at a safe for human respiration level of over 142 millibar.

19. A hyperbaric hypoxic fire escape and suppression system for buildings, said system comprising:

a building and an external hyperbaric hypoxic fire escape staircase shaft;

said staircase shaft having an internal atmosphere of a breathable fire-extinguishing composition at a hyperbaric pressure and pressurized doors that, when open, communicate with the building's floors through escape bridges, each having an entry door on the building's side;

said pressurized doors being normally closed and inaccessible due to a hyperbaric pressure applied from inside of said staircase shaft and release automatically by a spring-type device installed in a door frame when said pressure drops to near standard;

said staircase shaft communicating with a building's floor and/or floor unit through an emergency ventilation conduit for releasing said fire-extinguishing composition from said shaft in case of a fire;

a device supplying said composition into the staircase shaft under said hyperbaric pressure;

said device having an oxygen-extraction apparatus processing ambient air filtered from biological and chemical contaminants; said device communicating with said hyperbaric staircase shaft via preinstalled piping;

said device with the oxygen-extraction apparatus reducing oxygen content in the processed ambient air in a range between 8% and 14% and transmitting the oxygen-reduced product, being said breathable fire-extinguishing composition, into said staircase shaft.

20. The system according to claim 19 and said escape bridges being enclosed structures providing an airlock-type operation;

said internal atmosphere remains hypoxic after said hyperbaric composition being released into a part of the building and continues to be kept at a slightly positive pressure by said device providing a supplementary flow of said composition into said shaft for its further delivery into the building.

21. The system according to claim 19 and said escape bridges being open-air structures communicating with the external atmosphere;

said staircase shaft becomes normoxic after said hyperbaric composition being released into the building that continues to be kept at a slightly positive pressure by said device providing supplementary flow of said composition into said part of the building.

22. The system according to claim 19 and said hyperbaric pressure being normally kept inside said staircase shaft is in the range from 1 to 6 atmospheres of absolute pressure or higher, when needed.

23. A hyperbaric hypoxic fire escape and suppression system for transportation and communication tunnels and mines, said system comprising:

a normobaric tunnel or tunnel network having ambient air environment inside and communicating with the outside atmosphere;

a pressurized tunnel having a hyperbaric hypoxic atmosphere inside at an absolute atmospheric pressure above 1 atmosphere or 1.013 bar, said pressurized tunnel selectively communicating during normal operation with the outside atmosphere and said normobaric tunnel by multiple means of an airlock or a depressurization chamber;

said hyperbaric hypoxic atmosphere being an oxygen-reduced air having an oxygen content in the range from 7% and 14% and providing an oxygen partial pressure at a safe level above 142 millibar;

said oxygen-reduced air having a fire-extinguishing property;

an oxygen-extraction device communicating with said pressurized tunnel and providing said oxygen-reduced air at a hyperbaric pressure into said pressurized tunnel;

a fire-detection and control system that detects a fire in said normobaric tunnel and opens the airlock closest to the fire site, allowing said oxygen-reduced air to enter and flood the normobaric tunnel or its portion affected by fire in order to extinguish the ongoing fire rapidly.

24. The system according to claim 23 wherein said oxygen-extraction device communicating with an emergency gas storage container holding said oxygen-reduced air at a hyperbaric pressure that can be released into said pressurized tunnel when needed.

* * * * *